US009162654B2

United States Patent
Møller

(10) Patent No.: US 9,162,654 B2
(45) Date of Patent: Oct. 20, 2015

(54) ROAD VEHICLE WITH A BATTERY CHANGE SYSTEM

(75) Inventor: Jan Max Clausen Møller, Greve (DK)

(73) Assignee: PENDELMATIC INTERNATIONAL V/JAN MØLLER, Greve (DK)

(*) Notice: Subject to any disclaimer, the term of this patent is extended or adjusted under 35 U.S.C. 154(b) by 0 days.

(21) Appl. No.: 14/005,258

(22) PCT Filed: Mar. 15, 2012

(86) PCT No.: PCT/DK2012/000023
§ 371 (c)(1),
(2), (4) Date: Sep. 14, 2013

(87) PCT Pub. No.: WO2012/122986
PCT Pub. Date: Sep. 20, 2012

(65) Prior Publication Data
US 2014/0003895 A1    Jan. 2, 2014

(30) Foreign Application Priority Data

Mar. 15, 2011 (DK) .............................. 2011 00052 U

(51) Int. Cl.
*B60S 5/06* (2006.01)
*B60K 1/04* (2006.01)
*B60P 1/64* (2006.01)

(52) U.S. Cl.
CPC ... *B60S 5/06* (2013.01); *B60K 1/04* (2013.01); *B60K 2001/0416* (2013.01); *B60K 2001/0477* (2013.01); *B60P 1/6427* (2013.01); *B60Y 2200/14* (2013.01); *Y02T 90/124* (2013.01)

(58) Field of Classification Search
CPC ............ B60P 1/006; B60P 1/365; B60P 3/08; B60P 1/36; B60P 3/07; B60P 3/1025; B60P 1/003; B60P 1/6427; B65F 3/28; B65F 3/201; B65F 3/00; B65F 3/001; B65F 3/20; B65D 88/60; B65D 88/022; B65D 88/005; B65G 25/065; B65G 67/00; B65G 37/00; A01D 87/125; B64F 1/32; B61D 3/18; B61D 3/20; A01G 23/006; B62B 3/148; B60R 9/06; B60R 9/10; B60R 9/042; B60R 5/04; B60R 7/04; B60R 7/14; B60R 5/041; B60R 9/00; B60R 11/02; B60R 11/0241; B60R 11/00; B60R 7/02; B60R 16/04; A61G 3/061; Y02T 90/124; Y02T 10/7005; Y02T 90/14; B60K 1/04; B60S 5/06; B60S 6/06; B60N 3/102; B60N 3/106; B60N 3/005; B60L 11/1822; B60L 11/1877; H01M 2/1083; B66F 9/07531; B66F 9/0754; B62D 33/0273; B62D 43/04
USPC ............ 414/510, 511, 513, 517, 525.1, 679, 414/352, 353, 462, 522, 563, 428, 430, 466, 414/465, 464, 468, 477, 483, 484, 485, 414/498; 104/34; 269/26.09; 224/281, 496, 224/548, 564
See application file for complete search history.

(56) References Cited

U.S. PATENT DOCUMENTS 2,547,083 A * 4/1951 Lundgren ...................... 414/463
3,122,244 A * 2/1964 Corso ............................ 414/462

(Continued)

FOREIGN PATENT DOCUMENTS

| DE | 10 2005 022 094 A1 | 11/2006 |
| DE | 10 2005 051 015 A1 | 4/2007 |
| EP | 1 925 512 A1 | 5/2008 |

OTHER PUBLICATIONS

International Search Report, Jul. 26, 2012, from International Phase of the instant application.

Primary Examiner — Glenn Myers
(74) Attorney, Agent, or Firm — Jackson Patent Law Office

(57) ABSTRACT

The invention concerns a motor vehicle (1), preferably a truck or a lorry, comprising a battery exchange station (2), the battery exchange station (2) comprising at least one battery (3), an actuator element (4) and a connecting element (5) arranged between the battery (3) and the actuator element (4), the actuator element (4) being movable from a first to a second position, such that in the first position the at least one battery (3) is arranged completely under the motor vehicle (1), while in the second position the at least one battery (3) is arranged completely outside, preferably behind, the motor vehicle (1).

13 Claims, 6 Drawing Sheets

(56) References Cited

U.S. PATENT DOCUMENTS

Figure 1:
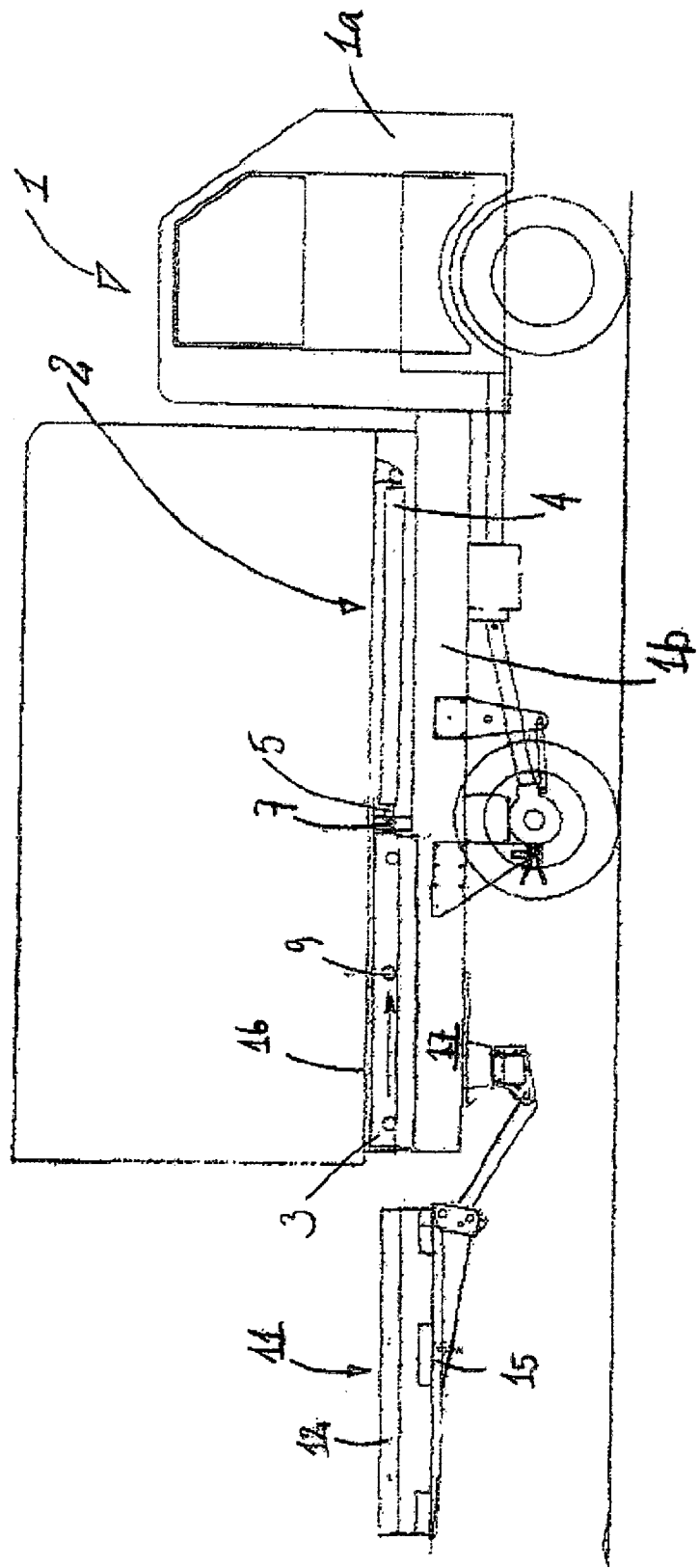

| | | | | |
|---|---|---|---|---|
| 3,375,959 A | * | 4/1968 | Hamilton | 224/484 |
| 3,930,552 A | * | 1/1976 | Kunkle et al. | 180/68.5 |
| 4,197,600 A | * | 4/1980 | Slabic | 5/118 |
| 4,312,620 A | * | 1/1982 | Muschalek, Jr. | 414/466 |
| 4,409,903 A | * | 10/1983 | Wilhelmsson et al. | 104/162 |
| 4,676,415 A | * | 6/1987 | Kennedy | 224/489 |
| 5,135,274 A | * | 8/1992 | Dodd | 293/117 |
| 5,271,705 A | * | 12/1993 | Pijanowski | 414/563 |
| 5,301,765 A | | 4/1994 | Swanson | |
| 5,564,767 A | * | 10/1996 | Strepek | 296/26.09 |
| 5,651,657 A | * | 7/1997 | Poindexter | 414/541 |
| 5,760,569 A | * | 6/1998 | Chase, Jr. | 320/104 |
| 5,860,786 A | * | 1/1999 | Aubrecht | 414/463 |
| 5,897,154 A | * | 4/1999 | Albertini et al. | 296/37.6 |
| 5,993,133 A | * | 11/1999 | Murray et al. | 414/463 |
| D466,469 S | * | 12/2002 | Nelson, Jr. | D12/221 |
| 6,524,056 B1 | * | 2/2003 | Kloster | 414/538 |
| 6,698,994 B2 | * | 3/2004 | Barrett | 414/462 |
| 6,938,553 B2 | * | 9/2005 | Tamaki et al. | 104/34 |
| 7,033,128 B2 | * | 4/2006 | Poindexter | 414/544 |
| 7,111,884 B2 | * | 9/2006 | Johnson | 296/26.1 |
| 7,909,560 B1 | * | 3/2011 | Nespor | 414/538 |
| 8,083,279 B1 | * | 12/2011 | Kullberg | 296/26.09 |
| 8,215,893 B2 | * | 7/2012 | Simpson | 414/478 |
| 8,696,295 B2 | * | 4/2014 | Robinson | 414/466 |
| 2004/0173408 A1 | * | 9/2004 | Szymanski et al. | 187/222 |

* cited by examiner

ROAD VEHICLE WITH A BATTERY CHANGE SYSTEM

The invention concerns a motor vehicle, particularly a truck or a lorry, with a battery exchange station.

Traditionally, and particularly in connection with the increasing interest in electrically powered motor vehicles during the later years, battery exchange stations for motor vehicles with an electrically powered motor have been provided in the form of trailer- and boogie-like devices, which may be coupled to and uncoupled from the motor vehicle in order to exchange the battery. One such exemplary device is described in WO 2010/145661 A2. These devices are of a relatively complicated construction, particularly as they are provided with their own supporting construction, which at least comprises a frame and wheels or a set of wheels, in order to interfere as little as possible with the payload and performance of the motor vehicle. Furthermore, the handling of such devices in connection with exchanging the battery is relatively complicated, particularly as they take up a considerable amount of space during shunting and charging.

A device of the kind described in the introductory part of claim 1 is known from patent document U.S. Pat. No. 3,834,563.

The present invention aims at providing a battery exchange station with a simple and inexpensive construction taking up as little space as possible both when mounted on the vehicle and in particular during transport and charging away from the vehicle and at the same time allowing for simple and fast exchange of the battery.

This aim is achieved with a motor vehicle as described in the characterizing part of claim 1.

Thereby a battery exchange station is provided, which is very simple in construction, which allows a fast and simple exchange of the battery by means of a simple mechanical operation of the actuator element, and which takes up as little space as possible during transport and storage in connection with exchange and charging as only the battery has to be moved from the motor vehicle to a charging station.

The dependent claims define advantageous embodiments of the invention.

Figure 2:
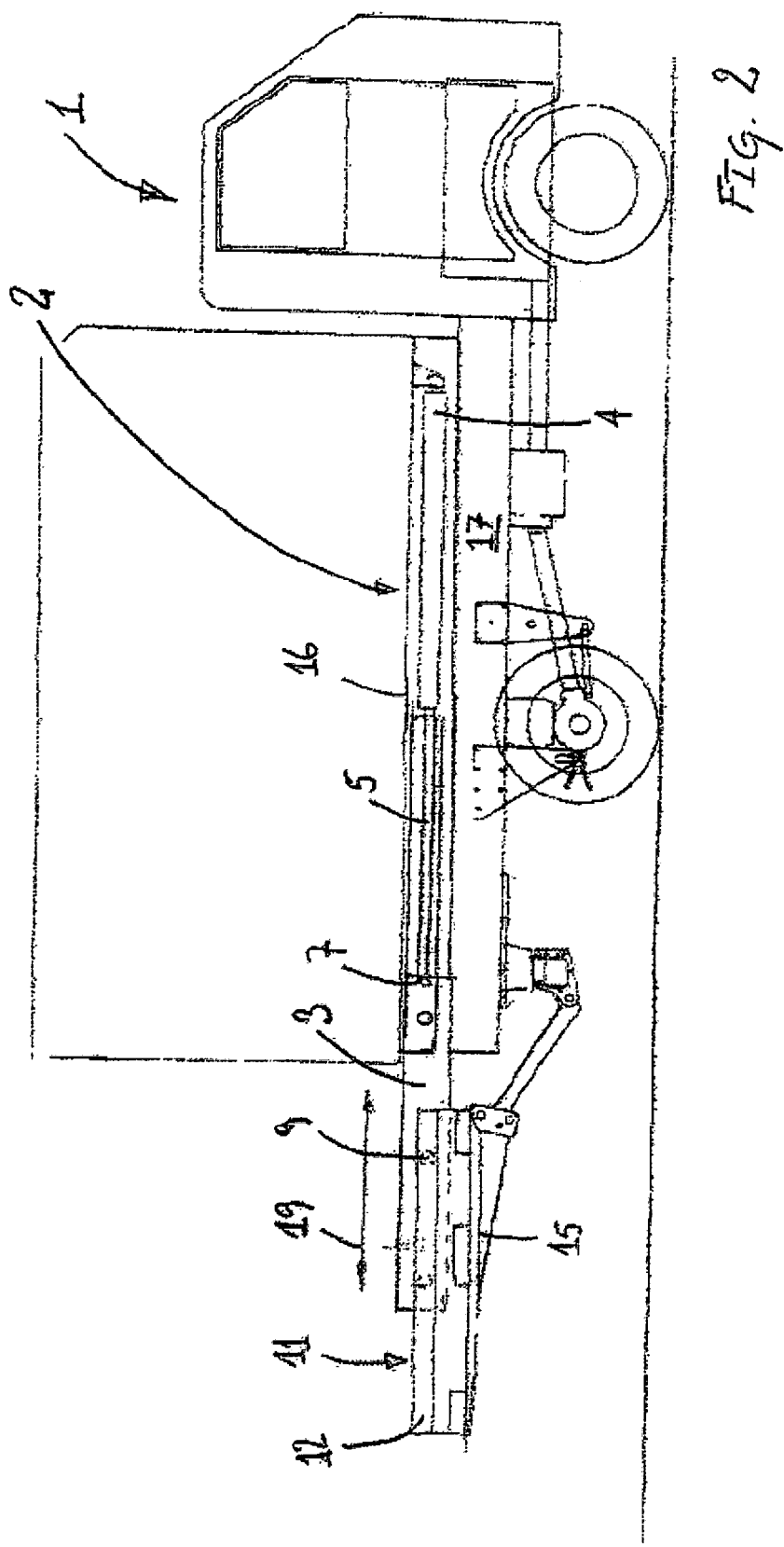
Figure 3:
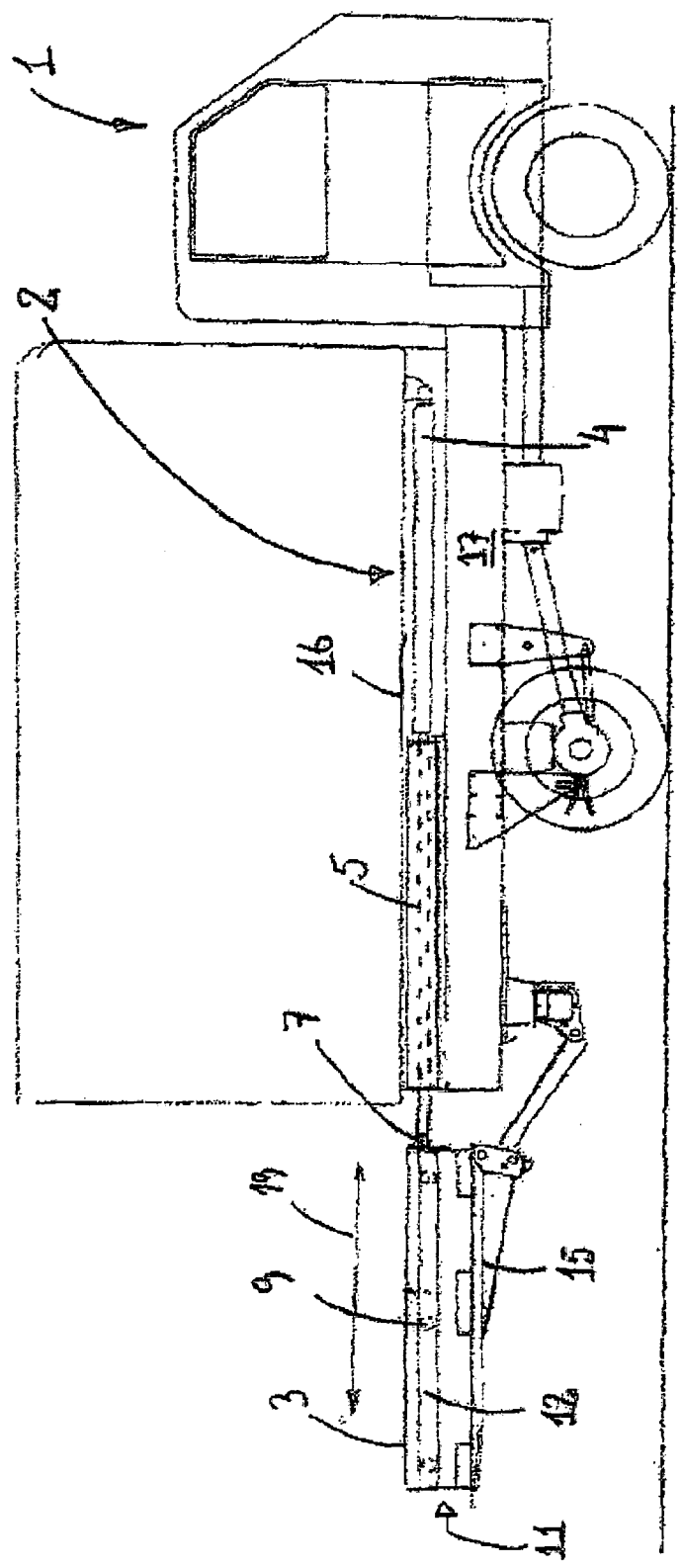
Figure 4:
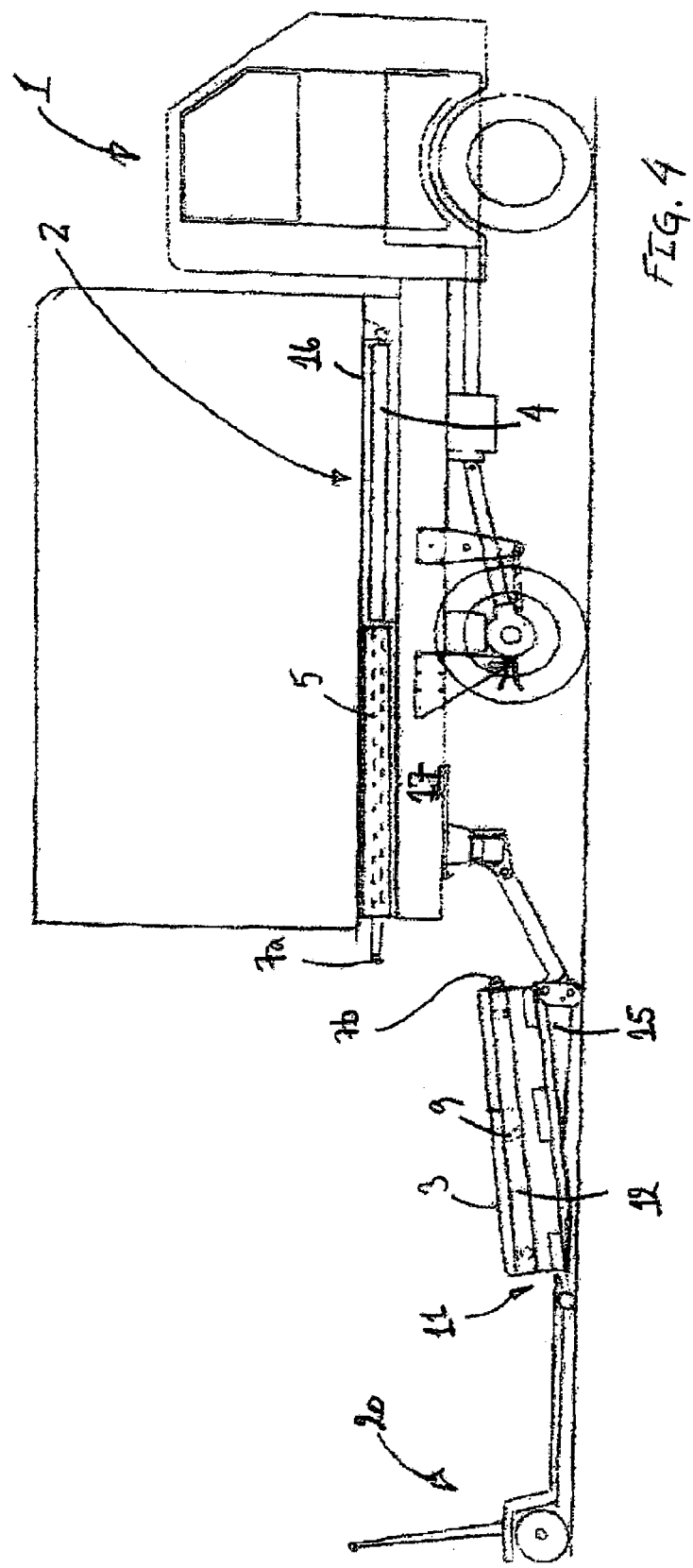
Figure 5:
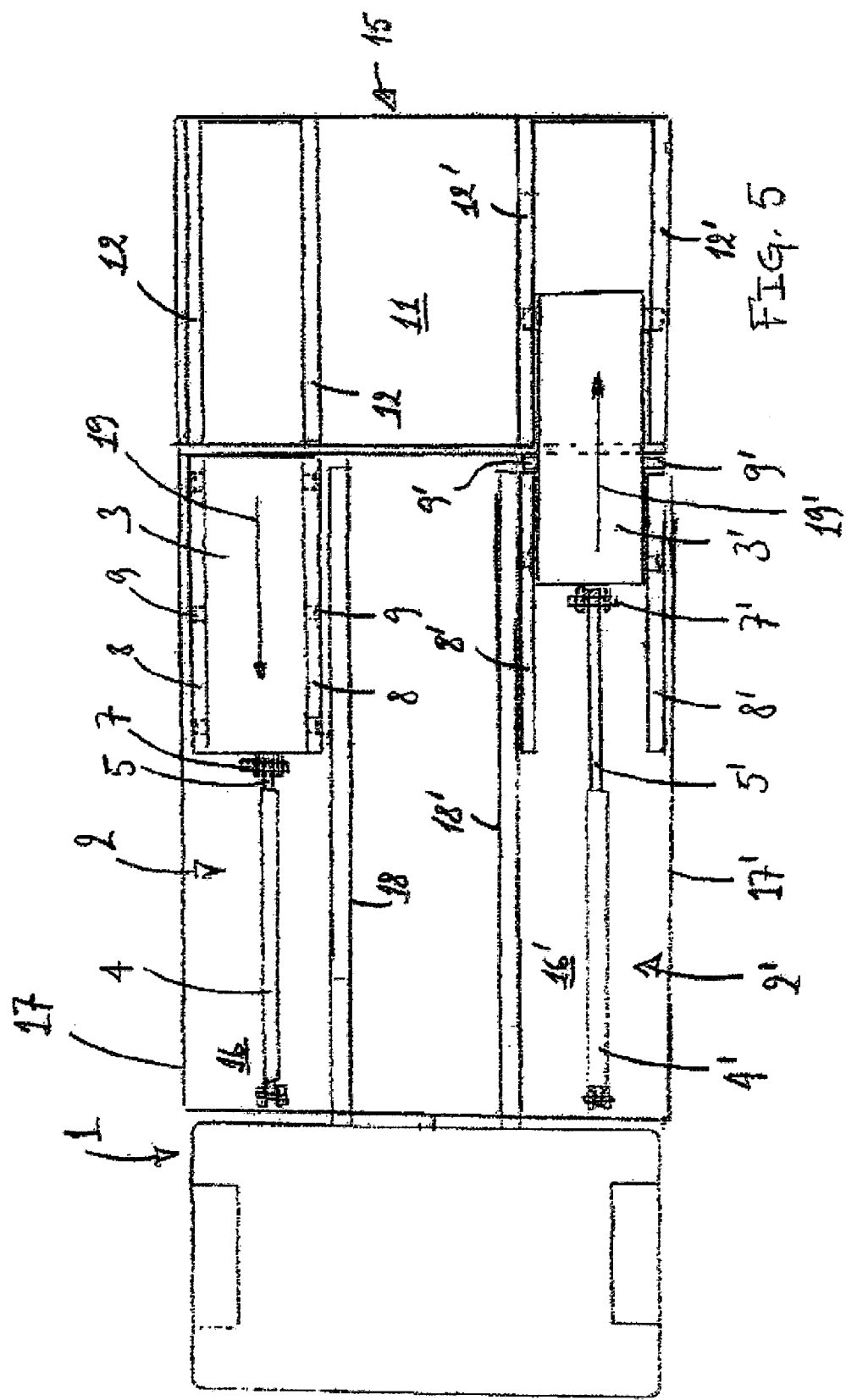
Figure 6:
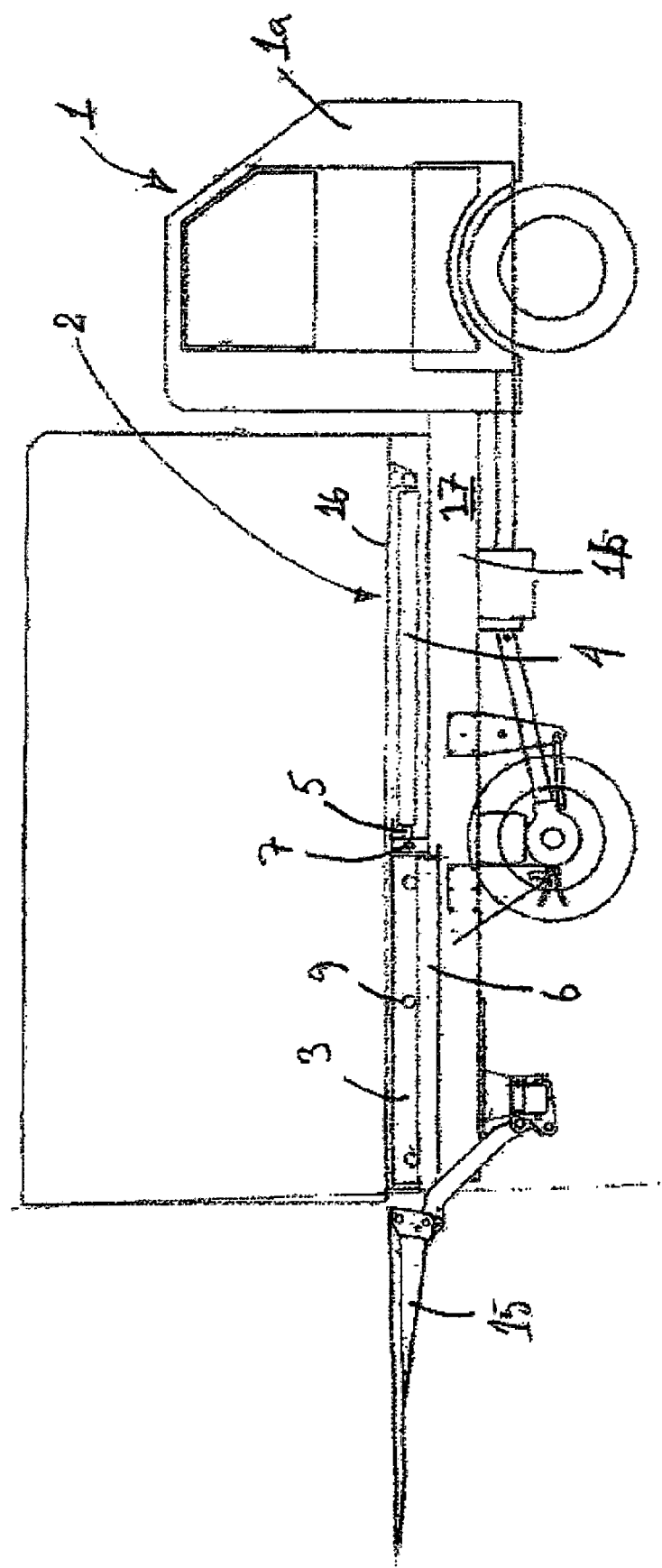

In the following the invention will be described in further details referring to the schematic drawing, on which:

FIG. 1 shows a side view of an embodiment of a motor vehicle according to the second aspect of the invention with a battery exchange station according to the first aspect of the invention in a first position, FIG. 2 shows a side view of the motor vehicle according to FIG. 1 with the battery exchange station in an intermediate position between the first position and a second position, FIG. 3 shows a side view of the motor vehicle according to FIG. 1 with the battery exchange station in the second position and placed in a battery storage element, FIG. 4 shows a side view of the motor vehicle according to FIG. 1 with the battery and the battery holding element of the battery exchange station in a position placed in the battery storage element and uncoupled from the remainder of the battery exchange station, FIG. 5 shows a motor vehicle according to the second aspect of the invention seen from below and with two battery exchange stations according to the first aspect of the invention, FIG. 6 shows a side view of an embodiment of a motor vehicle according to the second aspect of the invention with a battery exchange station according to the first aspect of the invention without the battery storage element and with a supporting element.

FIG. 1 shows a motor vehicle 1 according to the invention in the form of a truck or a lorry and with a driver's cab 1a and a truck bed 1b, the truck bed 1b comprising a bottom 16 and a side 17. The motor vehicle 1 furthermore comprises an end board 15, preferably a hydraulic end board. It is noted, that the motor vehicle 1 according to the invention may be any type of motor vehicle, such as coaches, vans, minibuses, buses, flatbed trucks and trucks or lorries of all weight classes with or without an end board. Likewise, the bottom 16 and the side 17 may be a bottom and a side of another part of a motor vehicle than a truck bed 1b.

Furthermore, the motor vehicle 1 is provided with a battery exchange station 2 according to the invention. The battery exchange station 2 comprises a battery 3, an actuator element 4 and a connecting element 5. One end of the coupling element 5 and the battery 3 is connected with each other by means of a coupling 7. The coupling 7 is in the embodiment shown a releasable coupling such as to allow for the battery 3 to be uncoupled from the connecting element 5. The other end of the connecting element is connected telescopically to the actuator element 4. In FIG. 1, the battery exchange station is shown placed in a first position, in which the battery 3, the connecting element 5 and the actuator element 4 in their entirety are arranged between the bottom 16 and the side 17 of the truck bed 1b of the motor vehicle 1. In the first position, the connecting element 5 lies completely inserted into the actuator element 4.

The battery exchange station preferably comprises one, two or three batteries under the bottom and in between the respective sides of the motor vehicle and the chassis frame of the motor vehicle. In the embodiment shown there is two batteries, cf. FIG. 5. Each battery may for e.g. a truck or a lorry have dimensions (length×width×height) in meters of about 1.2×0.65×0.12 and a weight of about 400 kg.

Preferably, the actuator element 4 is a hydraulic element, e.g. in the form of a hydraulic rod, and the connecting element 5 is a piston rod. As an alternative to a hydraulic element, a pneumatically actuated rod may be used.

As an alternative to connecting the connecting element 5 and the actuator element 4 telescopically, the connection may be an articulated connection and/or the connecting element 5 may be an articulated collapsible element.

In the embodiment shown, the battery exchange station 2 furthermore comprises a battery storage element 11, which is shown arranged on the end board 15 ready to receive the battery 3 of the battery exchange station 2 when it has to be exchanged. Preferably, the battery storage element 11 is provided with a device (not shown), such as a sliding bolt or another suitable fastener, for fixating the battery storage element 11 relative to the end board 15.

When the motor vehicle 1 is a motor vehicle without an end board, the battery storage element 11 may alternatively be placed on the ground or on a transport device, such as e.g. a fork lift, for transporting the battery.

The battery exchange station 2 is furthermore provided with an electrical outlet (not shown) preferably being arranged on the battery 3 and adapted for connection with a charging device. The electrical outlet may simultaneously be adapted for electrical connection with an electrical outlet (not shown) on the motor vehicle 1, thus permitting supplying an electrically powered motor of the motor vehicle 1 with electrical energy when the battery 3 of the battery exchange station 2 and the motor vehicle 1 are coupled together. In addition to comprising an electrically powered engine, the motor vehicle 1 may also be provided with a conventional combustion engine. In a particularly advantageous embodiment the electrical outlet is placed in connection with the coupling 7.

When the battery 3 and the motor vehicle 1 is to be uncoupled from each other, e.g. to exchange the battery 3, the battery storage element 11 is in the embodiment shown placed in a suitable manner on the end board 15 of the vehicle, e.g. by means of a fork lift, subsequent to the end board 15 being tilted down. Then the end board 15 is driven somewhat downwards, possibly to a predetermined position, whereupon the battery exchange station 2 is moved in direction of the arrow 19 in FIGS. 2 and 3, and thereby away from its first position under the bottom 16 of the motor vehicle 1, initially to the intermediate position shown in FIG. 2 and further to the completely extended second position shown in FIG. 3.

In the second position shown in FIG. 3, the connecting element 5 is placed pulled completely out of the actuator element 4, and at least the battery 3 and the coupling 7 is in their entirety placed behind, and thus outside, the motor vehicle 1. In the second position it is furthermore possible that at least a part of the connecting element 5 is likewise placed outside the motor vehicle 1.

When the battery 3 and the motor vehicle 1 is to be coupled to each other, the battery exchange station 2 is similarly moved in the opposite direction of the completely pulled out position, that is the second position, described above and shown in FIG. 3, via the intermediate position shown in FIG. 2 and to the completely pushed in first position under the bottom 16 of the motor vehicle 1 as shown in FIG. 1.

To ensure that the movement form the first to the second position, and vice versa, is stable and that the battery 3 is always ending in the correct position, the battery exchange station 2 is provided with a guide 8 (see FIG. 5), which in the embodiment shown is a U-shaped profile forming a surface of contact with a set of roller bearings 9. The roller bearings 9 is in the embodiment shown in FIGS. 1-4 arranged on the battery 8, while the guide 8 (not shown in FIGS. 1-4) is arranged on the side 17 and the chassis frame (not shown on FIGS. 1-4, cf. FIG. 5), respectively, of the motor vehicle 1. The opposite is of course likewise possible. The roller bearings and/or the guide may furthermore be coated with a friction reducing coating, e.g. Teflon. As an alternative to roller bearings and guide, slide bearings and a guide, which may be coated with a friction reducing coating, e.g Teflon, may be employed.

In FIG. 3 it is furthermore shown that the battery 3 in the second position is placed in the battery storage element 11, which is shown constructed in a way as a pallet. For ensuring correct positioning of the battery 3 in the battery storage element 11, the battery storage element 11 is provided with a guide 12, which similarly may be coated with a friction reducing coating, e.g. Teflon. If the battery 3 is provided with a guide rather than with the roller bearings 9 shown, the battery storage element may likewise be provided with roller bearings rather than with the guide 12 shown.

In FIG. 4 the battery exchange station 2 is shown in a position in which the battery 3 and the connecting element 5 is uncoupled from each other by releasing the coupling 7 in its two parts 7a and 7b, which may e.g. be a ring and a pin, a fastener, e.g. an eccentric fastener or an angular fastener, adapted for connection with a counterpart for a fastener or for that matter any other feasible type of releasable connection. Thereby, the battery storage element 11, which is now accommodating the battery 3, may be transported away from the motor vehicle by means of a transporting device 20, e.g. a fork lift, to a charging station, such that the battery 3 may be recharged and a new charged battery may be connected to the motor vehicle 1.

The term charging station as used herein is in principle intended to encompass any type of source of electrical energy, which is suitable for charging the battery 3 of the device. However, in particular it encompasses such charging stations being developed and adapted with the particular aim of charging electrical motor vehicles and hybrid motor vehicles and being intended for use in building up the infrastructure for such motor vehicles. An example of such a charging station is described in WO 2010/033883 A1. However, it is likewise possible to exchange the battery of a battery exchange station 2 according to the invention in considerably simpler and cheaper ways than by means of charging stations as those described in WO 2010/033883 A1. Particularly, it is feasible that any facility suitable for the purpose, particularly any fuel station, may be equipped with a supply of charged batteries as well as a transport device, such as a fork lift, by means of which a motor vehicle 1 may have a worn out battery exchanged on any fuel station, irrespective of the fuel station having a charging station or not.

In FIG. 5 a motor vehicle 1 is shown seen from below and provided with two battery exchange stations 2 and 2', each being constructed as described above in connection with FIGS. 1-4. FIG. 5 clarifies that the batteries 3 and 3' of the two battery exchange stations 2 and 2' are placed under the bottom 16 of the motor vehicle 1 and in between the sides 17 and 17', respectively, and the chassis frame 18 and 18', respectively, of the motor vehicle 1, Likewise it is shown clearly, how the battery exchange stations 2 and 2', respectively, each are provided with two guides 8 and 8', respectively, while the batteries 3 and 3', respectively, each on both sides are provided with roller bearings 9 and 9', respectively. Similarly, the battery storage element 11, which is placed on the end board 15, is provided with two sets of guides 12 and 12', respectively, one set for each of the two batteries 3 and 3', respectively.

FIG. 6 shows a motor vehicle 1 according to the invention provided with a battery exchange station 2 according to an alternative embodiment. The battery exchange station according to this second embodiment only differs from that shown in FIGS. 1-5 in two particulars. Firstly, it comprises a supporting element 6 adapted for supporting the battery 3 and thereby likewise to relieve the guides 8, that would otherwise carry the whole weight of the battery, and secondly it does not comprise a battery storage element 11. The supporting element 6 may e.g. be a tray or a plate attached to the motor vehicle 1, e.g. to the bottom 16, side 17 and/or chassis frame 18, and it is adapted for placing the battery 3 thereon or therein. In this embodiment the roller bearings 9 may as an alternative be mounted on the supporting element 6 rather than on the battery 3.

It is noted that the above description of preferred embodiments is merely an example, and that the skilled person would know that various variations are possible without departing from the scope of the claims. For instance the battery exchange station 2 is not limited to comprising an electrical battery 3, but may just as well alternatively comprise e.g. fuel cells for the combustion of hydrogen or the like.

The invention claimed is:

1. A road vehicle comprising:
   a cargo area;
   a bed under the cargo area, the bed defining a longitudinal axis;
   a plurality of wheels supporting the bed;
   a battery;
   an actuator element; and
   a coupling element between the battery and the actuator element, the actuator element being movable, in a direction parallel to the longitudinal axis of the bed, from a first position to a second position, such that in the first position the battery is completely under the cargo area, and in the second position the battery is completely horizontally displaced from the bed, the coupling element in the first position being completely under the cargo area and in the second position being releasable coupled to the battery, wherein, when the actuator element is in the first position, the actuator element is completely horizontally displaced from the battery, and most of the actuator element is in vertical alignment with the battery.

2. A system comprising the road vehicle according to claim 1; and a battery storage element for storing the battery away from the road vehicle.

3. A system according to claim 2, wherein the battery storage element comprises a guide adapted for guiding the movement of the battery into the battery storage element.

4. A system according to claim 3, wherein the guide is constructed as a roller bearing riding in a U-profile or being coated with a friction reducing coating.

5. A road vehicle according to claim 1, wherein the actuator element is a hydraulic element and the connecting element is a piston rod.

6. A road vehicle according to claim 1 further including
 a second battery;
 a second actuator element; and
 a second coupling element, the second coupling element being between the second battery and the second actuator element,
the second actuator element being movable from a first to a second position, such that in the first position the second battery is completely under the cargo area, and in the second position the second battery is completely horizontally displaced from the cargo area, the second coupling element in the first position being completely under the cargo area and in the second position being releasable coupled to the second battery, wherein the second actuator element can be in the first position of the second actuator element at a time when the first actuator element is not in the first position of the first actuator element.

7. A road vehicle according to claim 1 further including, a supporting element adapted for supporting the battery.

8. A road vehicle according to claim 1 further including
 an end board; and
 a battery storage element adapted for being fixated in relation to the end board.

9. A road vehicle according to claim 1 further including a guide adapted for guiding the movement of the battery, the guide including a U-profile, and a roller bearing riding in the U-profile.

10. A road vehicle according to claim 1 further including a guide adapted for guiding the movement of the battery, wherein the guide is coated with a friction reducing coating.

11. A road vehicle according to claim 1 wherein in the second position the battery is behind the cargo area.

12. A road vehicle according to claim 1 wherein the actuator element is a hydraulic rod.

13. A road vehicle according to claim 1 the actuator element is a pneumatic element.

* * * * *